E. W. STULL.
SYSTEM OF MOTOR CONTROL.
APPLICATION FILED JULY 20, 1910.
1,016,794.
Patented Feb. 6, 1912.
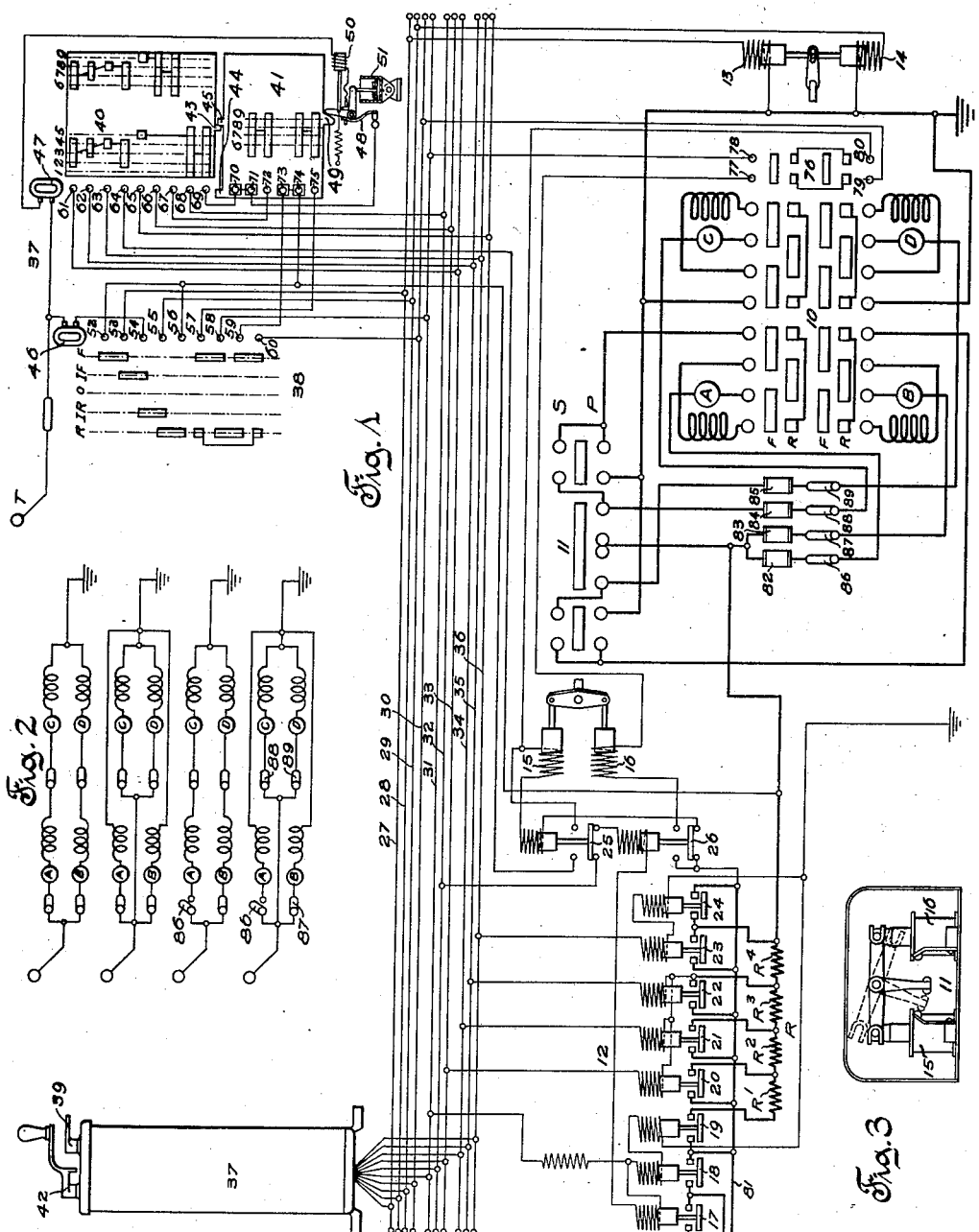

UNITED STATES PATENT OFFICE.

EMMETT W. STULL, OF MILWAUKEE, WISCONSIN, ASSIGNOR TO ALLIS-CHALMERS COMPANY, A CORPORATION OF NEW JERSEY.

SYSTEM OF MOTOR CONTROL.

1,016,794.  Specification of Letters Patent.  Patented Feb. 6, 1912.

Application filed July 20, 1910. Serial No. 572,891.

*To all whom it may concern:*

Be it known that I, EMMETT W. STULL, a citizen of the United States, residing at Milwaukee, in the county of Milwaukee and State of Wisconsin, have invented certain new and useful Improvements in Systems of Motor Control, of which the following is a full, clear, and exact specification.

My invention relates to motor control systems.

In many motor control systems disastrous results of various kinds may be produced by failure of some of the parts to operate in response to a movement of the master controller.

It is the main object of my invention to prevent such disastrous results. This is accomplished by providing certain electrical interlocks between the master controller and the main controller, so that in case the main controller should fail to operate properly it would be impossible to complete the motor circuit.

Among the further objects of my invention are to prevent the connection of the motors in series after they have been connected in parallel, and to improve the operation of the resistance-controlling part of the main controller. The first of these objects is accomplished by making the manually-operated controller in two parts with lost motion between them, so that in the movement of this controller one part of the controller is not moved until after the other has been moved a considerable distance. The connections between the two parts are such that in consequence of this lost motion no operative series connections are completed in the backward movement. The manually operated controller in this case may be either the master controller or the main controller. The latter of these objects is accomplished by connecting the operating solenoids of certain of the resistance switches in shunt to part of the resistance, whereby the mere short-circuiting of such resistance deënergize such solenoids.

It is still further the object of my invention to prevent a manually operated controller, whether it be a master controller or a main controller, from completing the circuits in a parallel position if it has been allowed to remain for any length of time in a position between the series and parallel positions. This is accomplished by automatically opening a switch in one of the necessary circuits in case the controller is allowed to remain in such intermediate position for any length of time.

The various novel features of my invention will be apparent from the specification and drawings, and will be particularly pointed out in the claims.

Figure 1 is a diagram of the electrical connections of my improved system; Fig. 2 is a set of simple diagrams showing the effect of opening one of the cut-out switches on the series and parallel connections of the motors; and Fig. 3 is a sectional view showing the structure of the series-parallel switch.

In the system illustrated there are four motors A, B, C, and D to be controlled. The control is effected by means of a main reversing switch 10, a main series-parallel switch 11, and a main resistance controller 12. The main reversing switch has forward and reverse positions, marked F and R respectively, and is moved into these positions by solenoids 13 and 14 respectively. This switch is preferably arranged so that it has no tendency to leave either position in which it is put. The main series-parallel switch 11 has series and parallel positions, marked S and P respectively, and is moved to such position by solenoids 15 and 16 respectively. This switch is preferably biased to its open position, a suitable structure for obtaining this result being indicated in Fig. 3. The main resistance controller 12 consists of a number of solenoid switches 17 to 24 inclusive. The number of these solenoid switches, if desired, may be either more or less than that illustrated. There are also two solenoid switches 25 and 26, each of which has two positions. These switches are electrically interlocked, and, in a manner hereinafter apparent, control the operation of the various other solenoids already referred to. The motor equipment illustrated for one car may be duplicated on a number of cars of a train, the operating solenoids on each car being connected to the train wires 27 to 36 respectively. On any car, or on every car if desired, there may be one or more master controllers 37, the connections of one such master controller being illustrated in Fig. 1. Each master controller consists of a master reversing switch 38, operated by the handle 39, and a master speed controller having two parts 40 and 41, the part 40 being operated directly by the handle 42 and operating the part 41 by a lost motion connection indicated by the projections 43, 44, and 45. The master reverser and master speed controller may be provided with blowout coils 46 and 47, other blowout coils being provided, if desired, wherever breaking of the circuit occurs. A switch 48, which is biased to open position, is held in closed position by a projection 49 when the master speed controller is in off position and by a solenoid 50 when any circuits are closed through the master speed controller, but opens slowly, being retarded by the dash-pot 51, when the master speed controller is not in off position and does not close any circuits. The master reverser and the master speed controller are provided with contact segments and contact fingers connected and interconnected as shown. The contact fingers of the master reverser are numbered from 52 to 60 inclusive, and those of the master speed controller from 61 to 75 inclusive.

The direction of movement is determined by the master reverser 38. As this is moved, say to the forward position F, it first passes through an intermediate position I F in which it connects the fingers 54 and 53, thus energizing the solenoid 13 of the main reversing switch (on each car if there is more than one) and moving such switch to forward position. The main reverser 10 has an auxiliary switch 76 which is moved with it, so that such movement of the main reverser to the forward position causes the auxiliary switch 76 to connect the contacts 77 and 78, and also the contacts 79 and 80.

To start the car or train the handle 42 of the master controller is now moved to the first position, in which a circuit is completed from the trolley T through the solenoid 50, the switch 48, fingers 71 and 70, fingers 69 and 68, train wire 31, and the operating solenoids of the switches 18 and 19. This causes these switches 18 and 19 to close, thus connecting the trolley T, (which for convenience is shown in Fig. 1 both near the master controller and near the main controller,) through such switches to the left hand end of the resistance R and through the switch 18 to the bus wire 81. The motor circuit, however, is still open at the series-parallel switch 11. The closing of the switch 18 completes a circuit which extends from the bus wire 81 through the switch 26 in its lower position, the operating coil of the switch 25, the solenoid 15, the contacts 80 and 79, the train wire 29, the contacts 60 and 59 of the master reverser, the contacts 73 and 74 of the part 41 of the master speed controller, the contacts 52 and 53 of the master reverser, the train wire 27, and the forward-closing solenoid 13 of the main reverser 10, which latter solenoid is included to make certain that the main reverser will not be jarred out of its forward position. In order for this circuit to be completed, it is necessary that the switch 26 be in its lower position, thus preventing energization of the solenoid 16, that the position of the main reverser 10 corresponds to that of the master reverser, in this case both being in the forward position, and that the part 41 of the master speed controller be in its initial or off position, to which position it can be brought only by moving the master speed controller to off position. This circuit, once closed, is maintained closed by the switch 25 in its upper position, which opens the circuit of the operating solenoid of the switch 26 and closes a circuit extending from the right hand end of the solenoid 15 to the contacts 52 and 53 and in shunt to those contacts, necessary for the first closing of the circuit, on the auxiliary switch 76, the lower part of the master reverser 38, and the part 41 of the master speed controller 41. Had the master and main reversing switches 38 and 10 been in the reverse position instead of in the forward position, the operating circuit would have been slightly different, for it would have extended from the right hand end of the solenoid 15 through the contacts 80 and 78, the train wire 30, the contacts 58 and 59 on the master reverser, the contacts 73 and 74 on the master speed controller, the contacts 56 and 55 on the master reverser, the train wire 28, and the reverse-closing solenoid 14 of the main reverser, and the part which would be shunted by the raising of the switch 25 would be that between the right hand end of the solenoid 15 and the contact 56 on the master reverser. In either case the circuit cannot be completed unless the positions of the main and master reversers correspond. The energization of the solenoid 15 throws the main series-parallel switch 11 to the series position and closes the motor circuit through all the resistance R. The motors are now connected as indicated (without the resistance sections) in the upper diagram of Fig. 2.

To increase the speed of the motors the master speed controller 47 is moved forward to the second position, thus completing through the fingers 61 and 64 on the part 40 of the master speed controller a circuit for the operating solenoid of the first resistance switch 20. This circuit is in shunt to the resistance section $R^4$. Closing this circuit causes the closing of the switch 20 to cut out the first resistance section $R^1$. For the third and fourth positions of the master controller, the operating solenoids of the switches 21 and 22 are completed through the fingers 62 and 64, and 63 and 64 respectively, of the part 40 of the master speed controller. These circuits are also in shunt to the resistance section R⁴, and upon their completion the switches 21 and 22 are closed to cut out the resistance sections R² and R³ respectively. Upon movement of the master speed controller to position 5, the circuit of the operating solenoids of the resistance switches 23 and 24 is completed from the contact finger 69, through the contact finger 65 and the train wire 36, thus causing the switches 23 and 24 to be lifted to cut out the final section R⁴ of the resistance R. The cutting out of this section of the resistance not only increases the speed of the motors to the highest speed, but also short-circuits the operating solenoids of the switches 21, 22, and 23, thereby causing said switches to drop without breaking their operating circuits. However, the circuit of these latter solenoids may be broken at the master controller after the solenoids of the switches 23 and 24 have been energized, if desired. During all this movement of the master controller, the part 41 of the master speed controller has remained stationary, the part 40 only moving.

As the master speed controller is moved forward beyond position 5, the projection 43 strikes the projection 44 and causes the part 41 of such controller to be carried forward also. This movement therefore disconnects the contact fingers 65, 68, 69, 70, 71, 73, and 74, and thus deënergizes the operating solenoids of the switches 18, 19, 23 and 24 to break the motor circuit. The operating solenoid of the switch 25, the solenoid 15, and the solenoid 13 remain energized until the motor circuit has been broken at the switch 18, this breaking of the motor circuit causing the deënergization of the solenoids mentioned and causing the switch 25 to drop and the series-parallel switch to leave the series position and swing through the off position toward the parallel position. If the forward movement of the master speed controller is continued to position 6, a circuit is completed, provided the switch 25 has dropped to its lower position, from the trolley T, through the solenoid 50, switch 48, contact fingers 71 and 72, contact fingers 67 and 66, train wire 32, switch 25 in its lower position, the operating solenoid of the switch 26, and the operating solenoids of the switches 17, 18, and 19. This circuit cannot be completed until the switch 25 has dropped, and therefore not until series circuits of the motors have been opened. The completion of the circuit above referred to causes the lifting of the switches 17, 18, 19, and 26, the first three closing the circuit from the trolley to the left hand end of the resistance R and to the bus-wire 81, and the last making it impossible to energize the operating solenoid of the switch 25 and closing a circuit from the bus-wire 81 through the parallel-closing solenoid 16 of the series-parallel switch 11, the contacts 77 and 78 of the main reverser 10, the train wire 30, the contact fingers 58 and 57 of the master reverser 38, the contact fingers 75 and 74 of the part 41 of the master speed controller, the contact fingers 52 and 53 of the master reverser, the train wire 27, and the solenoid 13. This latter circuit would be slightly different if the reversing switches were in a reverse position, for then it would extend from the right hand end of the solenoid 16 through the contacts 77 and 79 of the auxiliary switch 76, the train wire 29, and the contacts 60 and 57 of the master reverser, to the contact 75 of the master speed controller, and the solenoid 14 would be included in this circuit instead of the solenoid 13. The energization of the solenoid 16 causes the switch 11 to be closed to parallel position. This energization should ordinarily take place in time to catch the series-parallel switch as it swings from the series position. The closing of the series-parallel switch completes the motor circuit, the motors being connected in parallel as indicated in the second diagram of Fig. 2. The completion of the motor circuit causes the immediate energization of the operating solenoid of the switch 20, through the train wire 33 and the contact fingers 61 and 64, such solenoids being in shunt to the resistance section R⁴, as before. The switch 20 is thus closed to cut out the first resistance section R¹. Upon movement of the master controller to the seventh, eighth, and ninth positions respectively the resistance sections R², R³, and R⁴ are cut out in a manner precisely similar to that described in connection with the movement of the master controller to positions 3, 4, and 5.

If the operator waits too long after moving the master speed controller from the last series position before moving it to the first parallel position, the switch 48 opens automatically, though retarded by the dash pot 51, and prevents the subsequent movement of the master speed controller to the first parallel position from completing any operating circuits. Thus accidents on account of the operator's allowing the car or train to slow down while he holds the master controller between the series and parallel positions, are prevented. If the movement of the master controller from the last series to the first parallel position is quick enough, the holding solenoid 50 for the switch 48 is energized before such switch has time to open. To stop the car or train, the master controller is moved backward toward off position. If the master speed controller was in any of the parallel positions the circuits are broken by the movement of the controller backward beyond the sixth position, causing the circuits to be broken at the switches 17, 18, and 19. During this backward movement, the part 41 of the master speed controller remains stationary until the projection 43 hits the projection 45; in consequence, as the part 40 of the master speed controller passes through the series positions, the part 41 being still in the parallel position, the operating circuits for the main controller cannot be closed. This prevents the momentary connecting of the motors in series when stopping the car or train. The backward movement of the controller to off position also causes the projection 49 to close the switch 48, if the latter has opened. In order for the operating circuits to be closed, it is necessary for the two parts 40 and 41 to be in corresponding positions, and this is not possible during the backward movement of the controller after the part 40 has been moved backward beyond the sixth (or first parallel) position. Should the operator, after moving the master speed controller backward beyond the sixth position, not move it completely to the off position, but instead should move it forward again to one of the parallel positions, he can complete the proper operating circuits only in case such forward movement follows soon after the backward movement, as otherwise the switch 48 would be opened to prevent the completion of such operating circuits.

In the circuits of the motors A, B, C, and D there are four fuses 82, 83, 84, and 85, and four cut-out switches 86, 87, 88, and 89. These fuses and switches are preferably arranged in indicating relation to each other, so that upon the blowing of any fuse the corresponding cut-out switch may be opened. The opening of the cut-out switch of any motor, say the cut-out switch 86 for the motor A, opens the circuit of that motor for both the series and parallel connections and also opens the circuit of the motor C for the series connections. Thus, as shown in the third diagram of Fig. 2, for the series connections the motors B and D operate when the switch 86 is open, while for the parallel connections the motors B, C, and D all operate.

Many modifications may be made in the precise arrangement shown and described and all such which do not depart from the spirit and scope of my invention I aim to cover in the following claims.

What I claim as new is:

1. In a motor control system, a motor, a main controller therefor including a main reversing switch, a master controller therefor including a master reversing switch, the master reversing switch controlling the movements of the main reversing switch independently of the remainder of the master controller, and means for preventing the completion of the motor circuit unless the position of the main reversing switch corresponds to that of the master reversing switch.

2. In a motor control system, a plurality of motors, a main controller therefor including a main series-parallel switch, a master controller for controlling the operation of said main controller, and means for preventing the series-parallel switch, after it has once been moved to parallel position, from being moved to series position until the master controller has been brought to off position.

3. In a motor control system, a plurality of motors, a main controller therefor including a main series-parallel switch, a master controller for controlling the main controller and including two parts, one of which operates the other through a lost motion connection, and means for preventing the completion of the motor circuits through the main controller unless said two parts of the master controller are in corresponding positions.

4. In combination, a plurality of motors, a main controller therefor including a main series-parallel switch, a master controller for controlling the operation of the main controller, and means for preventing the master controller from causing the main controller to complete the motor circuit with the motors in parallel unless it does so within a predetermined time after the series circuit has been broken.

5. In a motor control system, a plurality of motors, a controller therefor for causing the motors to be connected in series and in parallel, means for preventing the controller from causing the production of the parallel connection of the motors if after the controller has been moved beyond the last series position the motor circuit has been allowed to remain open for more than a predetermined time.

6. In a motor control system, a plurality of motors, a controller therefor for causing the motors to be connected in series and in parallel, means for preventing the controller from causing the production of the parallel connection of the motors if after the controller has been moved beyond the last series position the controller is not moved to a parallel position within a predetermined time.

7. In a system of motor control, a plurality of motors, a main controller therefor including a main reversing switch and a main series-parallel switch, a master controller for controlling the main controller including a master reverser and a master speed controller, the latter including two parts one of which operates the other through a lost motion connection, and means for preventing the completion of the motor circuits by the main controller unless the master reverser and the main reverser correspond in position and the two parts of the master speed controller also correspond in position.

8. In a motor control system, a motor, a sectional resistance for the circuit thereof, and solenoid-closed switches in shunt to said sections, the operating solenoids of certain of said solenoid switches being connected in circuits which are in shunt to part of said resistance and are short-circuited upon the shunting of said part.

9. In combination, a translating device, a sectional resistance for the circuit thereof, solenoid-closed switches in shunt respectively to sections of said resistance, the operating solenoids of certain of said switches being in circuits which are each in shunt to a section of said resistance other than that controlled by the corresponding switch and are short circuited upon the shunting of said section, and means for controlling said circuits.

10. In a motor control system, a plurality of motors, a main controller therefor, a master controller for controlling the main controller and including two parts, one of which operates the other through a lost motion connection, and means for preventing the completion of the motor circuits through the main controller unless said two parts of the master controller are in corresponding positions.

11. In combination, a plurality of motors, a power-operated controller for varying the resistance of the circuit of such motors, a master controller for controlling the operation of said power-operated controller and for controlling the completion of the motor circuit and the connections of the motors in series and in parallel, and means for preventing the completion of the motor circuit with the motors in parallel unless within a predetermined time after such circuit with the motors in series has been broken.

12. In combination, a plurality of motors, a power-operated controller for varying the resistance of the circuit of such motors, a master controller for controlling the operation of said power-operated controller and for controlling the completion of the motor circuit and the connections of the motors in series and in parallel, and means for preventing the master controller from producing any operation of the power operated controller with the motors in parallel unless such operation is commenced within a predetermined time after the motor circuit with the motors connected in series has been broken.

13. In combination, a plurality of motors, a normally open switch in the circuit thereof, a controller for controlling the connection of the motors in series and in parallel and for causing the operation of said switch, and means for preventing the controller from causing the closing of said switch with the motors in parallel unless it does so within a predetermined time after the circuit with the motors in series has been broken.

14. In a system of motor control, a plurality of motors, a main controller therefor including a main reversing switch, a master controller for controlling the main controller including a master reverser and a master speed controller, the latter including two parts one of which operates the other through a lost motion connection, and means for preventing the completion of the motor circuits by the main controller unless the master reverser and the main reverser correspond in position and the two parts of the master speed controller also correspond in position.

15. In a motor control system, a plurality of motors, a controller therefor including two parts, one of which operates the other through a lost motion connection, and means for preventing the completion of the motor circuit unless such two parts are in corresponding positions.

16. In a motor control system, a plurality of motors, a controller therefor including two parts, each of said parts having series and parallel positions, one of said parts controlling the resistance of the motor circuit, and the other of said parts being operated through a lost motion connection from the part which controls the resistance of the motor circuit, and means for preventing the completion of the motor circuit unless the two parts of the controller are in corresponding positions.

17. In combination, a plurality of motors, a controller therefor having an off position, series and parallel positions, and an intermediate open circuit position between the series and the parallel positions, and means for preventing the controller from causing the completion of the motor circuit with the motors in parallel unless it does so within a predetermined time after the circuit with the motors in series has been broken.

Milwaukee, Wis., July 5, 1910.

In testimony whereof I affix my signature, in the presence of two witnesses.

EMMETT W. STULL.

Witnesses:
H. C. CASE,
CLARA E. BENSEL.

Copies of this patent may be obtained for five cents each, by addressing the "Commissioner of Patents, Washington, D. C."